July 15, 1969  G. ROTH  3,455,329
PNEUMATIC INDICATING DEVICE
Filed Aug. 5, 1966
3 Sheets-Sheet 1
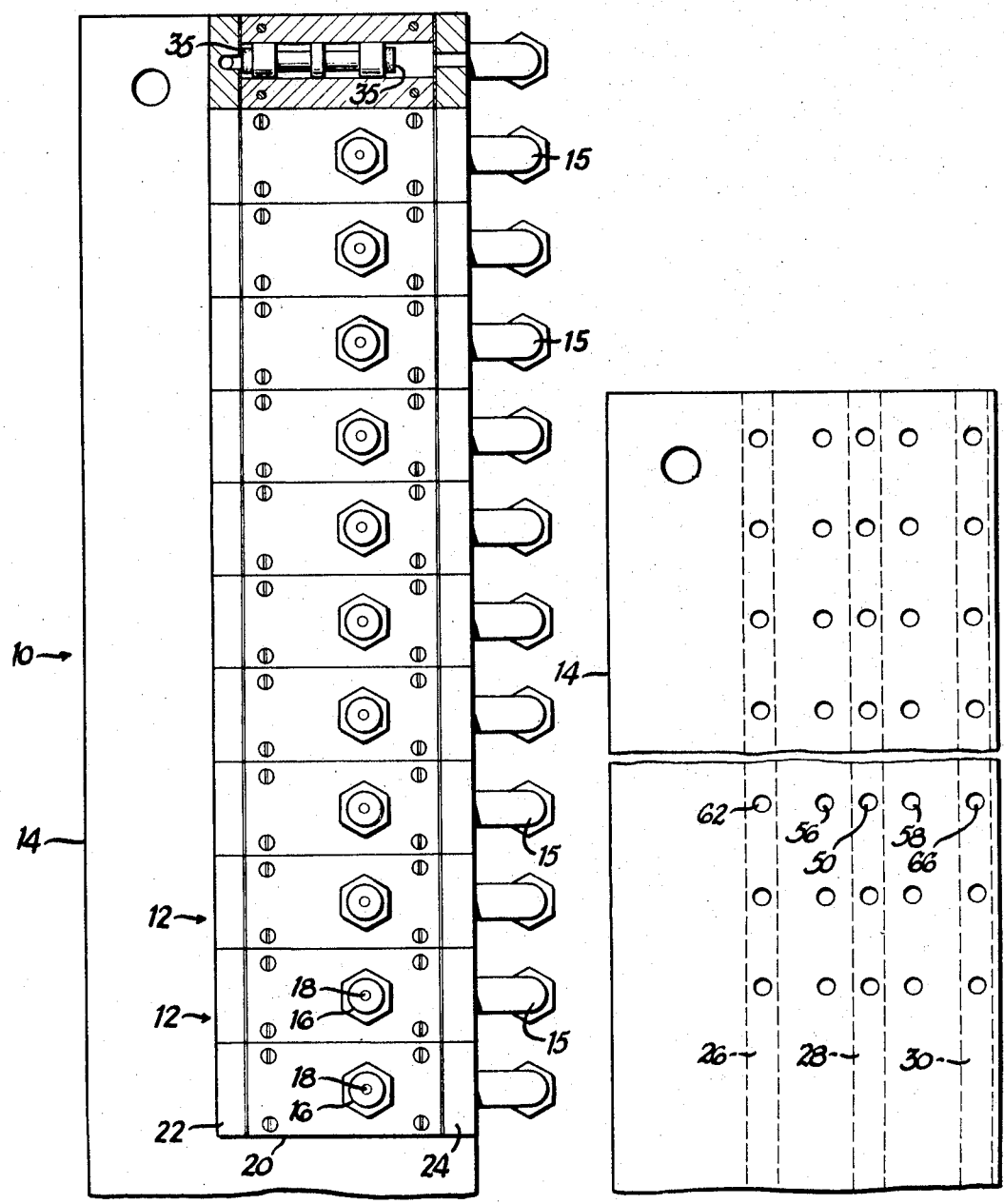
INVENTOR.
GABRIEL ROTH
BY
WILSON, SETTLE, BATCHELDER
ATT'YS. & CRAIG July 15, 1969
G. ROTH
3,455,329
PNEUMATIC INDICATING DEVICE
Filed Aug. 5, 1966
3 Sheets-Sheet 2
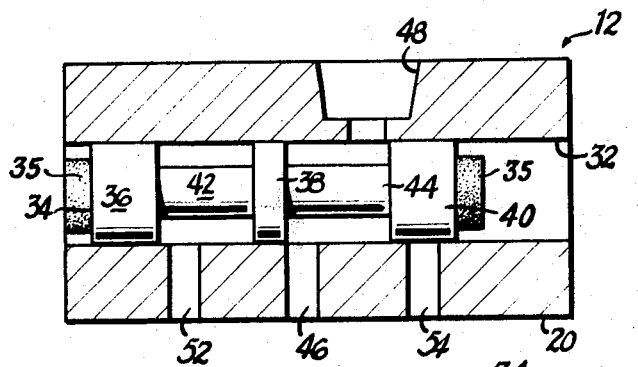
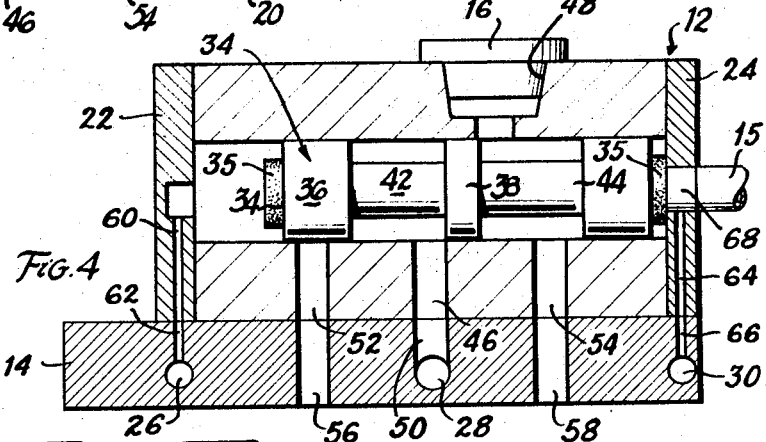
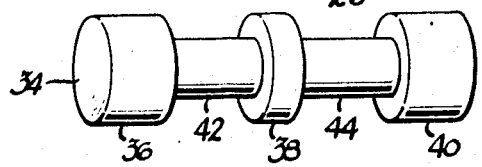
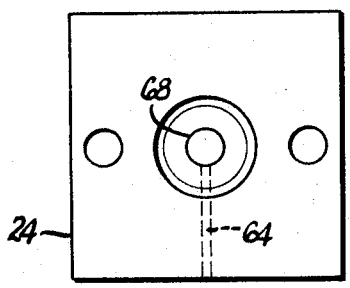
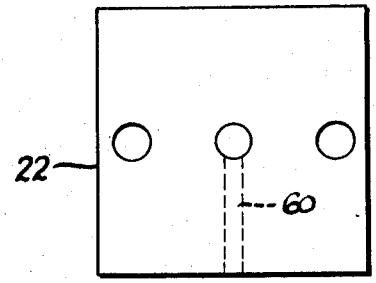
INVENTOR.
GABRIEL ROTH
BY
WILSON, SETTLE, BATCHELDER
ATT'YS. & CRAIG July 15, 1969  G. ROTH  3,455,329
PNEUMATIC INDICATING DEVICE
Filed Aug. 5, 1966  3 Sheets-Sheet 3

INVENTOR.
GABRIEL ROTH
BY
WILSON, SETTLE, BATCHELDER
ATT'YS. & CRAIG

United States Patent Office 3,455,329
Patented July 15, 1969

3,455,329
PNEUMATIC INDICATING DEVICE
Gabriel Roth, 6840 Roby Drive, Union
Lake, Mich. 48085
Filed Aug. 5, 1966, Ser. No. 570,653
Int. Cl. F16k 37/00; F17d 3/00; E03b 7/07
U.S. Cl. 137—552                    8 Claims

ABSTRACT OF THE DISCLOSURE

A sensing device including a valve spool shiftable by air pressure in a valve housing to control flow of air through the device. A plurality of such pneumatic devices may be operatively interconnected to cause initiation of various functions of a machine in a predetermined sequence based upon the operation of the individual pneumatic devices.

---

This invention relates to pneumatic devices and systems employing valves for control and indicating functions, and more particularly to a pneumatic device and system of devices capable of various sensing applications, such as hole sensing and liquid level sensing, as well as control functions in which a series of pneumatic devices operate sequentially to perform control functions sequentially.

Many types of machinery perform functions in a certain sequence, and in some cases it is desirable to control the machine such that the functions are initiated and performed automatically. Pneumatic control devices may be used for this purpose, but known devices and systems have been unduly complex and not well suited for the purpose. In particular, it would be desirable to have a pneumatic system composed of a number of pneumatic devices which operate in a predetermined sequence to in turn cause functions of a machine to be performed in a predetermined sequence in response to the operation of the pneumatic devices. It would also be desirable to have a pneumatic device suitable for the control system just referred to and also suitable for acting as a sensor; for example, to sense the presence or absence of holes in a workpiece or for sensing liquid levels or similar sensing functions.

The pneumatic device of the invention includes a valve spool which is shiftable by air pressure in a valve housing to control flow of air through the device. In a particular embodiment of the invention, the housing has a longitudinal bore and the valve spool is slidable axially in this bore. Input and output passages communicate with the bore, and the spool has a first position in which it blocks air flow from the input passage to the output passage and a second position in which it clears the passages to allow flow of air from the input passage to the output passage. In a sensing embodiment, a stream of air flows through a conduit in communication with one end of the spool, and if this conduit is blocked, air pressure builds up therein to shift the spool axially from its first position to its second position, thereby providing an output signal. This signal may be used to operate an indicator to show the presence of the blocked conduit condition. Where the device is used for hole sensing, the blocked condition occurs when no hole is present in the workpiece being sensed; no output is provided when a hole is present.

In another embodiment, an output signal is provided in the same way, i.e., when the valve spool is shifted, and this occurs in response to a control signal applied to one end of the spool. A plurality of the devices are connected in series with the input passage of each device except the first one connected to an output passage of the preceding device. The output signal produced when the spool of one device shifts is fed to the input passage of the next device. The latter device has a second output passage to which the input signal flows thus supplying an output signal which can be fed to an external control device. A control signal is then applied to one end of the spool of the second device to shift the spool and produce an output signal which is fed to the input passage of a third device, and the third device responds in the manner just described in connection with the second device. A series of devices composed of as many devices as desired may be operated to provide an output signal from each device in turn, and the output signals may be fed to power control devices which operate machinery to perform a number of functions in a desired sequence.

Accordingly, it is an object of the present invention to provide a pneumatic device capable of both sensing and control applications.

Another object of the present invention is to provide a pneumatic device for sensing and control applications in which a longitudinally shiftable spool member controls the flow of air through the device.

A further object of the invention is to provide a control system composed of a number of pneumatic devices which automatically operate sequentially to provide a series of output signals in a desired sequence and in numerical order, thus allowing a wide range of control since all pneumatic circuits have functions which happen one after the other or simultaneously. In a working embodiment composed of a series of pneumatic devices, the first device is operated and it causes the second device to supply an output signal to a controlled circuit. A return signal is supplied to the second device, and it operates to cause the third device to supply an output signal. This continues on in like manner through devices 4, 5, 6, etc., until the work cycle is complete. If simultaneous signals are desired, T takeoffs from the desired signal may be provided. Such a control system will eliminate circuit design in many cases.

Another object of the invention is to provide a pneumatic device including a housing having a longitudinal bore with a spool member slidable in the bore and input and output passages communicating with the bore, the spool member having one position in which it blocks flow of air between the input and output passages and another position in which it clears the passages to allow flow of air from input to output passages. The spool may be shifted between these positions by air pressure applied to its ends, and this air pressure may be derived from sensing signals in the sensing embodiment or from control signals in the control embodiment.

Other objects of this invention will appear in the following description and appended claims, reference being had to the accompanying drawings forming a part of this specification wherein like reference characters designate corresponding parts in the several views.

On the drawings:

FIGURE 1 is a plan view of a sensing system composed of pneumatic devices according to one embodiment of the invention;

FIGURE 2 is a fragmentary plan view of a manifold included in the system of FIGURE 1;

FIGURE 3 is a sectional view of a pneumatic device included in the system in FIGURE 1 showing a spool member in one position;

FIGURE 4 is a sectional view similar to FIGURE 3 but showing the spool member in a different position;

FIGURE 5 is an elevational view of the spool member of the device of FIGURES 3 and 4;

FIGURE 6 shows one end cap of the device of FIGURES 3 and 4;

FIGURE 7 shows the other end cap of the device;

Figure 9:
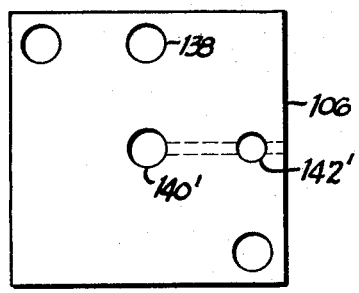
FIGURE 9 shows an end cap of the device of FIGURE 8.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

FIGURE 1 shows a pneumatic system 10 which is composed of a plurality of pneumatic devices 12 mounted in side-by-side relation on a manifold block 14. There are twelve pneumatic devices 12 in the embodiment of FIGURE 1. Each of these devices has a conduit 15 connected to one of its ends, and the conduit serves to direct a stream of air to an object to be sensed by the system. The system 10 is designed to sense the presence or absence of twelve holes in a workpiece. Specifically, the workpiece should have twelve holes in it, and the purpose of the sensing system 10 is to sense whether or not all of these holes are present. If one or more of the holes is missing, the sensing system should provide an indication for identifying which hole or holes is or are not present. The sensing devices 12 each have an indicator valve 16 on the top side of the device, and this valve includes a pin 18 which rises when a hole sensed by the device is not present. Thus, if any one of the pins 18 is in a raised position it indicates which one of the holes is not present in the workpiece. Although not limited to any particular construction, the indicator valves may be of the type disclosed in Patent No. 3,318,328.

Each device 12 has a housing including a body portion 20 and two end caps 22 and 24. There is an inlet opening in each of the end caps 22 and 24 and another inlet opening in the housing body 20. These openings will be referred to in connection with FIGURES 3, 4, 6 and 7, but it may be noted at this point that air pressure is supplied to the inlet openings through three elongated passages 26, 28 and 30 (FIGURE 2) which extend lengthwise of the manifold block 14. Air is supplied to the inlet opening in end cap 22 through passage 26, air is supplied to the inlet opening in body 20 through passage 28, and additional air is supplied to the inlet in end cap 24 through the elongated passage 30. Thus, it may be seen that the inlets of all of the devices 12 are supplied with air from inlet passages 26, 28 and 30 which are common to all of the devices 12.

Referring now to FIGURES 3 and 4, it may be seen that the body 20 of the housing for the device 12 has a longitudinal bore 32 extending through it. A spool member 34 is provided in the bore 32 and has a sliding fit with the bore so that the spool member 34 may shift back and forth in the bore in response to air pressure applied at its ends. The spool member 34, as shown in FIGURES 3-5, has three enlarged portions 36, 38 and 40, which are interconnected by reduced portions 42 and 44. The housing body 20 has an inlet opening 46 and an outlet opening 48 communicating between the bore 32 and the exterior of the housing body 20. The inlet opening 46 registers with an opening 50 in the manifold block 14, the latter opening 50 communicating with the supply passage 28 which extends through the manifold block 14. The outlet opening 48 leads to the poppet valve 16 and serves to supply air pressure to the pin 18 of the poppet valve when an output signal is being supplied through the device. The housing body 20 also has two exhaust passages 52 and 54 which communicate with holes 56 and 58 respectively, the latter holes extending through the manifold block 14 for discharging air from the device. The passages 52 and holes 56 are provided to exhaust any air which may be trapped between the enlarged portions 36 and 38 of valve spool 34.

The spool member 34 has two operating positions within the bore 32. The spool member is shown in a left-hand position in FIGURE 3, and it is shown in a right-hand position in FIGURE 4. Discs 35 of magnetic rubber are provided on the ends of the spool to hold it in either its left-hand or right-hand position. In the right-hand position of the spool member (FIGURE 4), the central enlarged portion 38 of the spool member blocks flow of air from inlet passage 46 to the outlet passage 48. Thus, whenever the spool member is in this right-hand position, the pin 18 of the poppet valve 16 for the device will be withdrawn and not visible. If the spool member 34 is shifted to its left-hand position (FIGURE 3), the central enlarged portion 38 clears the passages 46 and 48 to allow flow of air therebetween. Air pressure is then exerted on the pin 18 of the poppet valve 16 causing the pin 18 to extend from the valve to thereby indicate an output signal.

The shifting of the spool member 34 between its left-hand and right-hand positions is accomplished by application of air pressure to the ends of the spool member. Air pressure is supplied to the left-hand end of the spool member through an opening 60 provided in end cap 22. In FIGURE 7, it may be seen that opening 60 extends from the bottom of the end cap 22 to a central portion thereof which communicates with the bore 32 through the housing body 20. The opening 60 registers with another opening 62 which extends into the manifold 14 and communicates with the passage 26 in the manifold. Pulses of air are supplied to the manifold passage 26. When one of these pulses is present, air pressure is applied through opening 62 and opening 60 to the left-hand end of the spool member 34. This pressure shifts the spool member 34 to the right-hand position (FIGURE 4) so that the central enlarged portion 38 blocks flow of air from the inlet passage 46 to the outlet passage 48. The pulse of air in passage 26 affects all of the devices 12 in the same way so that all of the spool members of the devices 12 are shifted to their right-hand position if they are not already in that position.

At the other end of the housing, there is an opening 64 in end cap 24 which communicates with an opening 66 in the manifold 14 which in turn communicates with the passage 30 extending through the manifold. A steady air pressure is applied to the passage 30 such that air flows through opening 66 and opening 64 to a central opening 68 extending through the cap member 24. This air is directed away from the spool through the conduit 15 and it is supplied to the object being sensed. A conduit extension may be coupled to the conduit 15 so as to supply the stream of air directly to the place where a hole should exist in the object being sensed. If there is a hole at this place, the stream of air from conduit 15 will merely flow through the hole and there will be no change in the condition of the sensing device. However, if a hole is not present, air pressure builds up in the conduit 15 and is applied to the right-hand end of spool member 34. This air pressure overcomes the holding force of the magnetic disc 35 and shifts the spool member 34 to its left-hand position, thus allowing air to flow between the inlet passage 46 and the outlet passage 48 to in turn actuate the pin 18 of the poppet valve 16. The pin 18 is extended by this air pressure and provides an indication that there is no hole present at the location being sensed by the device.

It is apparent from the foregoing description that the pneumatic device 12 may be used in a variety of sensing applications and is not limited to the hole sensing application which has been described by way of example. The device might be applied to the sensing of liquid levels or to the sensing of the absence or presence of objects in the path of the air stream supplied from conduit 15. Another application for the device 12 is in control systems as will now be described in connection with FIGURES 8 through 11.

Figure 8:
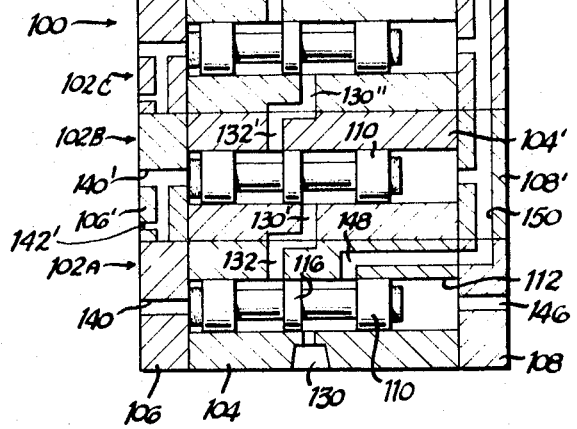
FIGURE 8 is a plan view, partly in section, of a control system including a plurality of pneumatic devices according to another embodiment of the invention.

The control system 100 of FIGURE 8 includes a plurality of pneumatic devices 102 which are connected in a series arrangement so that the devices may be operated sequentially. The individual devices are identified 102A, 102B, 102C, etc., to differentiate them from each other. Each of the devices 102 includes a housing having a body portion 104 and end caps 106 and 108. The body and end caps of the first device 102A are slightly different from those of the other devices in the series so numerals 104', 106' and 108' have been used to identify the body and end caps of the other devices.

Figure 11:
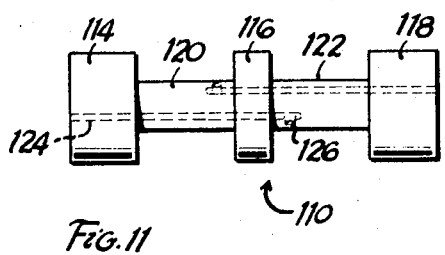
FIGURE 11 shows a spool member of the device.

Inside the body of each device there is a spool member 110 which fits in a longitudinal bore 112 extending through the body of the device. The spool member 110 is shown in FIGURE 11, and in this view it may be seen that there are enlarged portions 114, 116 and 118 and reduced portions 120 and 122 interconnecting the enlarged portions. A small passage 124 is drilled from the left-hand end of the spool member in FIGURE 11 through enlarged portion 114, reduced portion 120 and enlarged portion 116, and this passage communicates with an opening 126 extending into the reduced portion 122.

In the valve body 104, and also in the other valve bodies 104', there is an input passage 130 on one side of the body and there is an output passage 132 on the other side of the body. When the spool member 110 is in its left-hand position as shown in FIGURE 8, the enlarged portion 116 at the center of the spool member blocks the path between the input opening 130 and the output opening 132 so that no air can flow between these openings. When the spool member 110 is shifted to the right to its right-hand position, the central portion 116 clears the passages 130 and 132 and allows air to flow through these passages into the next pneumatic device 102B. The output passage 132 of the first device 102A is connected to the input passage 130' of the next device 102B. With the spool member 110 of the first device 102A in its right-hand position, air flows through passages 130 and 132 of device 102A into passage 130' of device 102B, but the air cannot flow to the output passage 132' of device 102B so long as its spool member 110 remains in its left-hand position.

Figure 10:
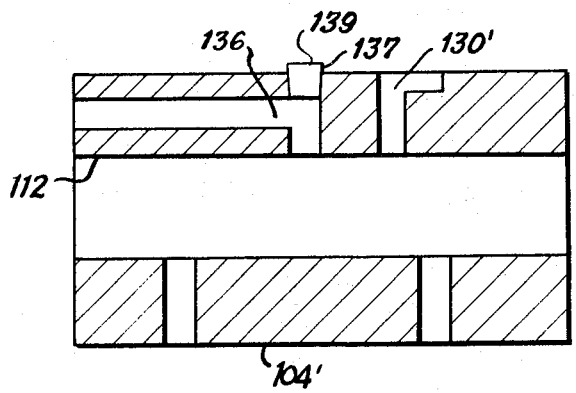
FIGURE 10 is a sectional view of the housing part of the device of FIGURE 8.

The air can, however, flow through another output passage which is shown in FIGURE 10. The latter passage 136 extends from the central bore 112 upward into the body 104' and extends from a portion within the body to the left-hand end of the body 104'. Opening 137 is plugged as by a plug 139. Thus, when air flows into device 102B through the input passage 130, the air is supplied through passage 136 and out of a port 138 provided in the end cap 106'

This output signal may be supplied from the device 102 to a utilization deivce which may be a power valve for operating some portion of a machine. When this control function has been performed, a signal may be supplied back to the second device 102B, and this signal is supplied to a control signal input 140 in end cap 106' which communicates with the left-hand end of the spool member 110. The control signal shifts the valve body 110 to the right in device 102B, and thus clears a passage between its input port 130' and output port 132'. A signal is then supplied through these latter passages to the input passage 130" of the third device 102C in the series which is constructed like the second device 102B and operates in the same manner.

The first device 102A receives a start signal at its opening 140' from an outside source such as a hand-actuated valve. This signal passes through opening 140 and applies pressure to the left end of the spool member 110 causing it to shift to the right to its right-hand position. This initiates the supplying of air through passages 130 and 132 to the second devce 102B and causes an output signal to be supplied from opening 136 of device 102B to the utilization device (not shown). After the desired function has been accomplished by the utilization device, a control signal is returned to passage 140' of device 102B, and this control signal shifts the valve member 110 of device 102B to the right, thus supplying air through passages 130' and 132' of device 102B to passage 130" of the third device 102C. When control signals are being returned from utilization devices in this manner, the opening 142' in the end cap 106 is plugged to prevent air from escaping there.

In some cases it is desired to have the spool member of the deivce shift after a predetermined time, rather than waiting for the return of a control signal from the utilization device. This can be accomplished by the use of ports 140' 142' in the end cap 106. Port 140' is connected by a lateral passage to port 142'. A threaded plug member may be screwed into port 140' so as to control the amount of air which can flow out of port 142'. Air flows to these ports through the opening 124 in the valve body as shown in FIGURE 11. Thus, when the spool member 110 is in its left-hand position, air flows through passage 124 to the port 142' where it emerges from the device. If port 140' is completely plugged so as to block off the passage to port 142', air pressure builds up at the left-hand end of the spool member and causes that member to shift to the right to its right-hand position. The time required for air pressure to build up sufficiently to shift the spool member is controlled by the setting of the threaded plug in port 140'.

The last device in the series is device 102L. When an output signal is supplied from this device. it is fed to the openng 146 at the right-hand end of device 102A so as to reset the spool member in the device to its left-hand position. With spool member 110 of device 102A in this left-hand position, it may be seen in FIGURE 8 that the inlet passage 130 is in communication with another outlet passage 148 in the other side of the body 104. This outlet passage 148 is connected by a passage 150 to the right-hand ends of all of the other pneumatic devices in the series. Thus, the air supplied to the outlet passage 148 is utilized to reset all of the other devices in the series back to the original condition wherein the spool members 110 are in their left-hand position.

It is evident from the foregoing description that the invention provides a versatile pneumatic device which is capable of both sensing applications and control application. The device can be used to indicate the presence or absence of holes in a workpiece and with only slight modification it can be used in a control system to provide output signals in a predetermined sequence for operating external equipment. Much of the interconnecting of devices is accomplished by internal porting, and there is a minimum of pneumatic lines required to connect the pneumatic deivce to utilization devices and to each other. The devices can be fabricated economically and will provide reliable operation over long periods of time. It is a universal type circuit capable of running most air opearted equipment with built-in self checking.

I claim:

1. A pneumatic device comprising a housing having a longitudinal bore extending through the same, first and second passages communicating between said bore and the exterior of said housing, a slidable spool member fitting in said bore and slidable longitudinally thereof, said spool member having an intermediate enlarged portion fitting snugly with said bore for controlling flow of air between said first and second passages and having a reduced portion on each side of said enlarged portion and a further enlarged portion at each end of said spool member, the latter enlarged portions being exposed at the ends of said housing for application of air pressure thereto, said spool member having a first position in said bore wherein said intermediate enlarged portion thereof blocks flow of air between said first and second passages and having a second position in said bore wherein said intermediate enlarged portion clears said first and second passages to allow flow of air therebetween through one of said reduced portions, means to supply air pressure to one of said enlarged end portions of said spool member to shift said spool member to said first position, means for supplying air pressure to the other enlarged end portion of said member to shift said spool member to said second position, means for supplying air pressure to said first passage, said air supplying means for shifting said spool member to said second position comprising a jet sensing structure having conduit means for directing a stream of air away from said other end portion of said spool member whereby blocking of said conduit means builds up air pressure against said other end portion to shift said spool member to said second position, and means for supplying air under pressure to said conduit means.

2. The pneumatic device of claim 1 including indicator means responsive to air pressure in said second passage to provide a visual indication that said conduit has been blocked.

3. The pneumatic device of claim 2 in which said indicator means comprises a poppet valve coupled to said second pasage having a movable member shiftable to a warning position by air pressure in said second passage supplied thereto from said first passage upon shifting of said spool member to said second position.

4. A pneuamtic device comprising a housing having a longitudinal bore extending through the same, first, second and third passages communicating between said bore and the exterior of said housing, a slidable spool member fitted in said bore and slidable longitudinally thereof, said spool member having an intermediate enlarged portion fitting snugly with said bore for controlling flow of air between said passages and having a reduced portion on each side of said enlarged portion and a further enlarged portion at each end of said spool member, the latter enlarged portions being exposed at the ends of said housing for application of air pressure thereto, said spool member having a first position in said bore wherein said intermediate enlarged portion thereof blocks flow of air between said first and said second passages and allows flow between said first and third passages and having a second position in said bore wherein said intermediate enlarged portion allows flow of air between said first and second pasasges and blocks flow of air between said first and third passages, means supplying pulses of air pressure to one of said enlarged end portions to shift said spool member to said first position, means supplying air pressure to the other enlarged end portion of said member to shift said valve spool member to said second position, and means for supplying air pressure to said first passage.

5. The pneumatic device of claim 4 having a second identical pneumatic device coupled thereto with the first passage of said second device in communication with said second passage of said first-named pneumatic device.

6. A pneumatic system comprising a plurality of pneumatic devices each including a housing having a longitudinal bore therein, a spool member fitting in said bore and slidable longitudinally thereof, and first and second passages communicating between said bore and the exterior of said housing, said spool member having a first position in said bore in which said spool member blocks flow of air between said first and second passages and having a second position in said bore in which said spool member clears said first and second passages to allow flow of air therebetween, means common to all of said pneumatic devices for supplying air pressure to one end of said spool members of said devices to shift the same to said first position thereof, means for individually supplying air pressure to the other end of said spool members for selectively shifting any one or more therof to said second position, and means for supplying air pressure to said first passages of said devices.

7. A pneumatic system comprising a plurality of pneumatic devices each including a housing having a longitudinal bore therein, a spool member fitting in said bore and slidable longitudinally thereof, and first, second and third passages communicating between said bore and the exterior of said housing, said spool member having a first position in said bore in which said spool member blocks flow of air between said first and second passages but allows flow of air between said first and third passages and having a second position in which said spool member allows flow of air between said first and second passages but blocks flow of air between said first and third passages, means connecting said pneumatic devices in a series arrangement wherein said first passage of each device other than a first device is connected to said second passage of a preceding device, means for applying air pressure selectively to one end of the spool members of said devices to shift the same sequentially to said second position, means for supplying air pressure to the other end of said spool members to shift the same to said first position, and means for supplying air pressure to said first passage of said first device.

8. A pneumatic sensor comprising a housing having a longitudinal bore extending through the same, a first lateral passage communicating between said bore and the exterior of said housing, a poppet in said first passage and movable by gas pressure therein between a reset position and an actuated position, a plurality of additional lateral passages communicating between said longitudinal bore and the exterior of said housing, a slidable spool member fitting in said bore and slidable longitudinally thereof, said spool member having a plurality of enlarged portions fitting snugly with said bore and having reduced portions interconnecting said enlarged portions for allowing passage of gas between said first passage and one of said additional lateral passages when a reduced portion is aligned with said passages, said spool member having a reset position toward one end of said bore in which gas flows from another one of said additional lateral passages through said bore and out of said housing and in which said first passage is not in communication with any of said additional lateral passages, conduit means for directing the gas flow from said housing which when blocked causes gas pressure to build up therein and shift said spool member to the other end of said housing, thereby placing said one lateral passage in communication with said first passage to thereby actuate said poppet for indicating the blockage of said conduit means.

References Cited
UNITED STATES PATENTS

| 2,933,105 | 4/1960 | Jerman | 137—596.18 XR |
| 3,100,508 | 8/1963 | Mercier | 137—625.66 |
| 3,228,300 | 1/1966 | Potts et al. | 137—557 XR |
| 3,318,328 | 5/1967 | Schrader | 137—557 |

HENRY T. KLINKSIEK, Primary Examiner

U.S. Cl. X.R.

137—271, 557, 596.18, 625.66